(No Model.)

C. R. BROWN.
CABLE MOTOR.

No. 291,144. Patented Jan. 1, 1884.

Witnesses
John K. Smith
J. H. Logan

Inventor
Charles R. Brown
by his attorneys
Bakewell & Kerr

UNITED STATES PATENT OFFICE.

CHARLES R. BROWN, OF IMPERIAL, ASSIGNOR OF ONE-HALF TO WILLIAM McCREERY, OF PITTSBURG, PENNSYLVANIA.

CABLE-MOTOR.

SPECIFICATION forming part of Letters Patent No. 291,144, dated January 1, 1884.

Application filed September 7, 1883. (No model.)

*To all whom it may concern:*

Be it known that I, CHARLES R. BROWN, of Imperial, in the county of Allegheny and State of Pennsylvania, have invented a new and useful Improvement in Cable-Motors; and I do hereby declare the following to be a full, clear, and exact description thereof.

My invention relates to an improvement in devices for connecting a car or train of cars with a traveling band or cable in such a manner that the car may be caused to travel with the cable or stopped at any desired point without interfering with the traveling motion of the cable; and it consists in one or more wheels mounted on the car, around which wheels the traveling cable passes, said wheels having cable and brake-band grooves, in combination with brake-bands and mechanism for releasing the brake-bands or tightening the same, for locking the wheels so as to prevent them from turning on their axles, when, owing to the friction between the cable and the periphery of the wheels, the car is caused to travel with the cable or band.

I will now describe my invention, so that others skilled in the art may manufacture and use the same, reference being had to the accompanying drawings, forming a part of this specification, in which—

Figure 1:
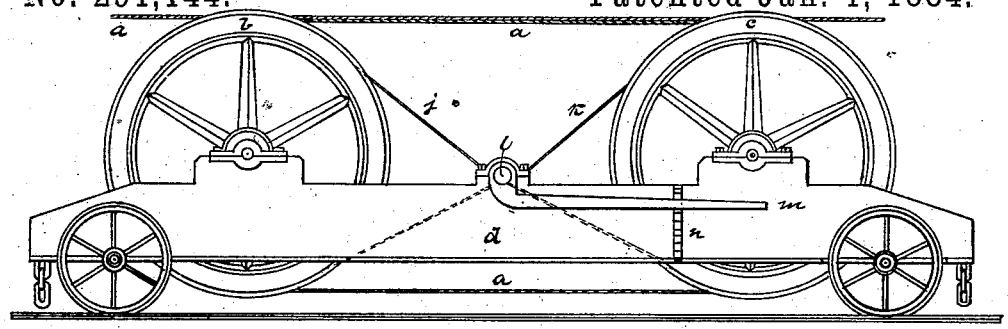
Figure 2:
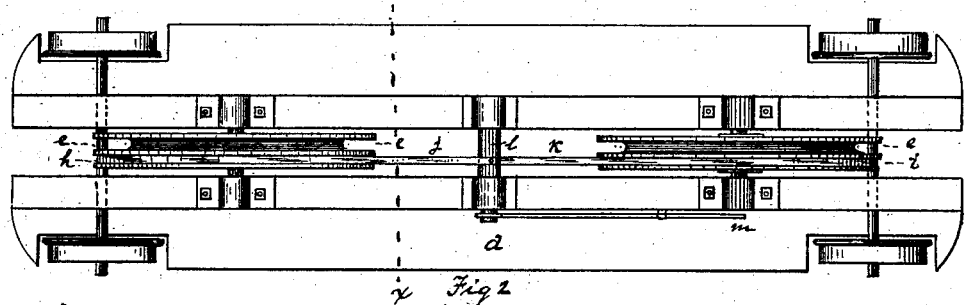
Figure 3:
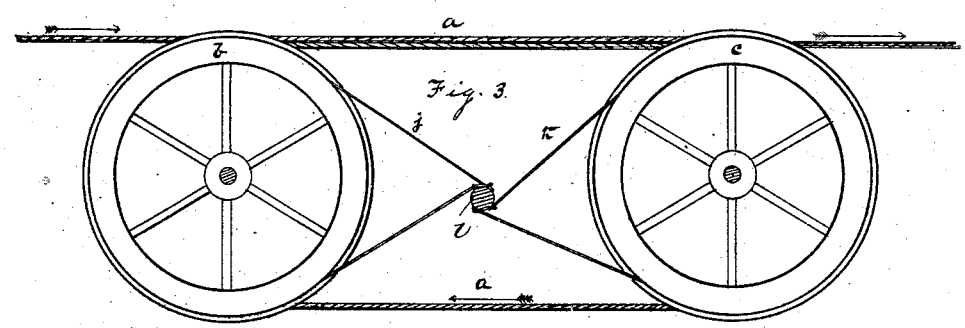
Figure 4:
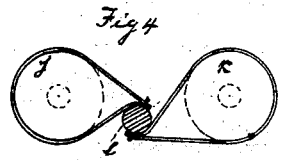
Figure 5:
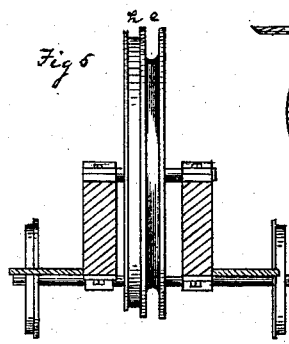
Figure 6:
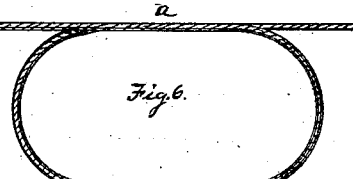

Figure 1 is a side elevation of my improved device. Fig. 2 is a plan view of the same. Fig. 3 is a side elevation of the band-wheels, brake, and cable. Fig. 4 is a view illustrating the brake or locking device. Fig. 5 is a cross-section through the line $x\,x$, Fig. 2. Fig. 6 is a view illustrating the position of the cable around the band-wheels.

Like letters of reference indicate like parts wherever they occur.

In the drawings my invention is shown adapted for drawing coal-cars, the cable $a$ passing over the train of cars and around two band-wheels, $b\,c$, which are situated in a line with each other and the cable $a$, and are journaled in suitable bearings on the car $d$. On the periphery of these wheels are grooves $e$ for the reception of the cable, which cable passes first above the wheel $b$, around the front portion of the periphery of the wheel $c$, back under the wheel, to and around the rear portion of the periphery of the wheel $b$, and thence forward above the wheel $c$, in a line with the direction of its approach to the car. On the periphery of the wheels $b$ and $c$ are other grooves, $h$ and $i$, around which are placed loops or bands $j\,k$, which are secured or fastened to opposite sides of the rod or cylinder $l$, which rod extends transversely across the car between the wheels $b$ and $c$, so that by turning the rod on its axis the bands $j$ and $k$ are either loosened, so as to permit the rotation of the wheels $b$ and $c$, or are drawn down in the grooves $h$ and $i$ around the wheels $b$ and $c$, and bear tightly against the same, so as to lock the wheels $b$ and $c$ and prevent them from turning.

At one end of the rod $l$ is a lever, $m$, extending along the side of the car, so that by pressing the lever down the rod is caused to turn. The end of the lever, when so lowered, is held in position by the teeth of the ratchet $n$.

The operation is as follows: The cable $a$, traveling over the wheels $b$ and $c$, causes them to revolve on their axes, and the car $e$ remains stationary. In order to put the car in motion, the lever $m$ is pressed down, which turns the rod or cylinder $l$, and draws the bands $j$ and $k$ tight in the grooves $h$ and $i$, and, owing to the friction between the bands and the grooves, the wheels $b$ and $c$ are locked or prevented from turning. The cable $a$, continuing to travel, and, owing to the friction, being prevented from slipping over the grooves $e$, carries the car $d$ with it over the track $o$. In order to stop the car, it is simply necessary to unlock the wheels $b$ and $c$ by releasing the lever $m$, when the wheels $b$ and $c$ will again revolve, and the car $d$ will remain at rest.

The advantages of my invention are, owing to the friction-brake and the friction attachment of the cable to the car, injury to the cable or car is prevented from suddenly starting or stopping the same, and also that the car is easily and rapidly started or stopped. This car $d$ is coupled with trains of cars, and acts as a motor therefor.

Although I have described two driving-wheels, $b$ and $c$, and a certain way of connecting them with the cable, I do not desire to limit myself to the same, as a single wheel may be substituted therefor, and the cable may be passed first completely around the periphery of the wheel b, and then around the wheel c; or more than two wheels may be employed, thereby increasing the friction.

My improved device may also be differently arranged on the car, as by placing it under the car instead of in the manner described.

Having thus described my invention, what I claim, and desire to secure by Letters Patent, is—

1. In combination with an endless cable, a car having mounted thereon a revolving wheel provided with a cable-groove and a brake-band groove, a brake-band arranged in the brake-groove of the wheel, and mechanism for tightening and loosening the brake-band, substantially as and for the purposes specified.

2. The combination, with a car or truck adapted to be driven by an endless band or cable, of two revolving wheels mounted on the car, each of said wheels having a cable-groove, two brake-bands, one arranged around each of said wheels, and a rotating shaft arranged between the wheels, and to which the brake-bands are secured, substantially as and for the purposes specified.

In testimony whereof I have hereunto set my hand this 29th day of August, A. D. 1883.

CHARLES R. BROWN.

Witnesses:
JOHN S. KENNEDY,
JAMES K. BAKEWELL.